United States Patent
Gonze et al.

(10) Patent No.: US 8,083,839 B2
(45) Date of Patent: Dec. 27, 2011

(54) RADIANT ZONE HEATED PARTICULATE FILTER

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 1034 days.

(21) Appl. No.: 11/964,233

(22) Filed: Dec. 26, 2007

(65) Prior Publication Data
US 2011/0214569 A1    Sep. 8, 2011

Related U.S. Application Data

(60) Provisional application No. 60/972,072, filed on Sep. 13, 2007.

(51) Int. Cl.
| | |
|---|---|
| B01D 46/00 | (2006.01) |
| B01D 39/06 | (2006.01) |
| B01D 39/14 | (2006.01) |
| B01D 24/00 | (2006.01) |
| B01D 50/00 | (2006.01) |
| F01N 3/00 | (2006.01) |

(52) U.S. Cl. .......... 95/278; 55/522; 55/524; 55/523; 55/282.3; 422/169; 422/170; 422/171; 422/172; 422/177; 422/178; 422/179; 422/180; 422/181; 422/182; 60/297

(58) Field of Classification Search ........... 55/522–524, 55/282.3; 422/169–172, 177–182; 95/278; 60/297

See application file for complete search history.

(56) References Cited

U.S. PATENT DOCUMENTS

| | | | | |
|---|---|---|---|---|
| 4,505,726 A | * | 3/1985 | Takeuchi et al. | 55/282 |
| 4,516,993 A | * | 5/1985 | Takeuchi et al. | 55/283 |
| 4,535,589 A | * | 8/1985 | Yoshida et al. | 60/303 |
| 4,544,388 A | * | 10/1985 | Rao et al. | 55/282 |
| 4,867,768 A | * | 9/1989 | Wagner et al. | 96/386 |
| 5,457,945 A | * | 10/1995 | Adiletta | 55/301 |
| 5,762,885 A | * | 6/1998 | Debbage et al. | 422/171 |
| 6,090,172 A | * | 7/2000 | Dementhon et al. | 55/282.3 |
| 6,176,896 B1 | * | 1/2001 | Dementhon et al. | 95/14 |
| 6,304,814 B1 | * | 10/2001 | Masters et al. | 701/110 |
| 6,454,834 B1 | * | 9/2002 | Livingstone et al. | 95/11 |
| 6,770,116 B2 | * | 8/2004 | Kojima | 95/14 |
| 2004/0128960 A1 | * | 7/2004 | Frankle et al. | 55/282.3 |
| 2005/0232829 A1 | * | 10/2005 | Fuls | 422/180 |

OTHER PUBLICATIONS

U.S. Appl. No. 11/557,715, filed Nov. 8, 2006, Eugene Gonze.
U.S. Appl. No. 11/561,100, filed Nov. 17, 2006, Eugene Gonze.
U.S. Appl. No. 11/561,108, filed Nov. 17, 2006, Eugene Gonze.
U.S. Appl. No. 11/956,722, filed Dec. 14, 2007, Eugene Gonze.

* cited by examiner

*Primary Examiner* — Jason M Greene
*Assistant Examiner* — Amber Orlando (57) ABSTRACT

A system includes a particulate matter (PM) filter including an upstream end for receiving exhaust gas and a downstream end. A radiant zoned heater includes N zones, where N is an integer greater than one, wherein each of the N zones includes M sub-zones, where M is an integer greater than or equal to one. A control module selectively activates at least a selected one of the N zones to initiate regeneration in downstream portions of the PM filter from the one of the N zones, restricts exhaust gas flow in a portion of the PM filter that corresponds to the selected one of the N zones, and deactivates non-selected ones of the N zones.

16 Claims, 8 Drawing Sheets

RADIANT ZONE HEATED PARTICULATE FILTER

CROSS-REFERENCE TO RELATED APPLICATIONS

This application claims the benefit of U.S. Provisional Application No. 60/972,072, filed on Sep. 13, 2007. This application is related to U.S. patent application Ser. Nos. 11/557,715 filed on. Nov. 8, 2006, 11/561,100 filed on Nov. 17, 2006, 11/561,108 filed on Nov. 17, 2006, and 11/956,722 filed on Dec. 14, 2007. The disclosures of the above applications are incorporated herein by reference in their entirety.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to radiant heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A system includes a particulate matter (PM) filter including an upstream end for receiving exhaust gas and a downstream end. A radiant zoned heater includes N zones, where N is an integer greater than one, wherein each of the N zones includes M sub-zones, where M is an integer greater than or equal to one. A control module selectively activates at least a selected one of the N zones to initiate regeneration in downstream portions of the PM filter from the one of the N zones, restricts exhaust gas flow in a portion of the PM filter that corresponds to the selected one of the N zones, and deactivates non-selected ones of the N zones.

A method includes providing a particulate matter (PM) filter comprises an upstream end for receiving exhaust gas and a downstream end, arranging a radiant zoned heater that comprises N zones, where N is an integer greater than one, wherein each of the N zones comprises M sub-zones, and where M is an integer greater than or equal to one, selectively activating at least a selected one of the N zones to initiate regeneration in downstream portions of the PM filter from the one of the N zones, restricting exhaust gas flow in a portion of the PM filter that corresponds to the selected one of the N zones, and deactivating non-selected ones of the N zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure utilizes a heater with zones. In one implementation, a radiant light heater is spaced from the PM filter. In other words, the radiant heater is located in front of the PM filter but is not in contact with the downstream PM filter. The heater selectively heats portions of the PM filter. The heater may be mounted close enough to the front of the PM filter to control the heating pattern. The length of the heater is set to optimize the exhaust gas temperature.

Thermal energy is transmitted from the heater to the PM filter by radiant light and the exhaust gas. As such, the PM filter is predominantly heated by radiant light and convection. The radiant heater is divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter is regenerated by selectively heating one or more of the zones in the front of the PM filter and igniting the soot using the radiant heat while exhaust gas flow is restricted. When a sufficient face temperature is reached, the radiant light is turned off and exhaust gas is allowed to flow. The burning soot then cascades down the length of the PM filter channel, which is similar to a burning fuse on a firework. In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclosure.

The burning soot is the fuel that continues the regeneration. This process is continued for each heating zone until the PM filter is completely regenerated.

The heater zones are spaced in a manner such that thermal stress is mitigated between active heaters. Therefore, the overall stress forces due to heating are smaller and distributed over the volume of the entire radiant heated PM filter. This approach allows regeneration in larger segments of the radiant heated PM filter without creating thermal stresses that damage the radiant heated PM filter.

A largest temperature gradient occurs at edges of the heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Figure 1:
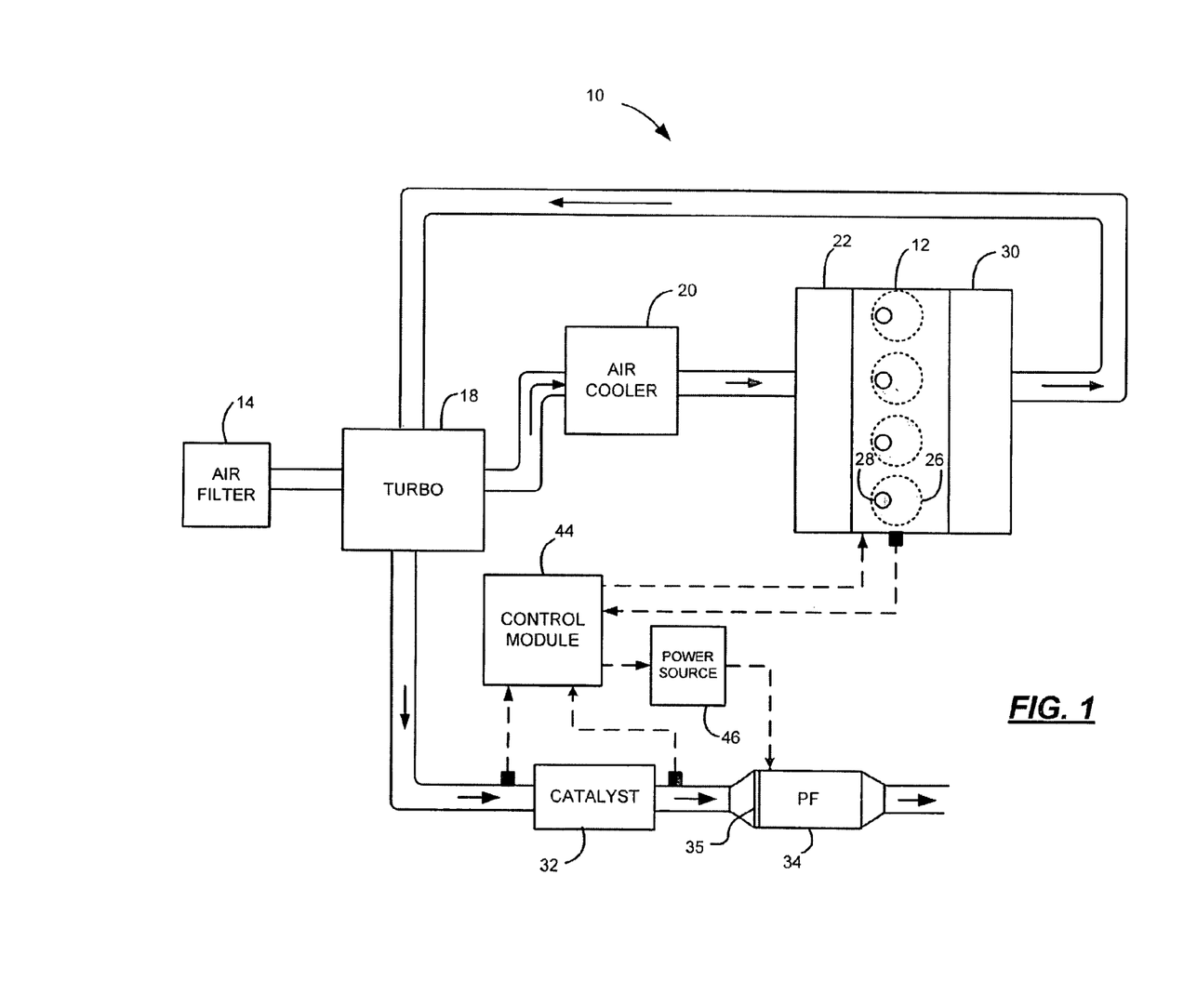
FIG. 1 is a functional block diagram of an exemplary engine including a particulate matter (PM) filter with a radiant zoned inlet heater.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with a radiant zoned inlet heater 35. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The heater 35 is spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current is controlled to the PM filter assembly 34 via a power source 46 to initiate the regeneration process. The duration of the regeneration process may be varied based upon the estimated amount of particulate matter within the PM filter assembly 34.

Current is applied to the radiant zoned inlet heater 35 during the regeneration process to active the heater. More specifically, the control module 44 selectively activates light sources of selected zones of the heater 35 for predetermined periods while exhaust flow through the selected zone is restricted. The light sources emit radiant energy (i.e. heat) that is focused toward the PM filter assembly 34. When an ignition temperature is reached, the control module 44 allows the exhaust gas to flow through the corresponding zone and may deactivate the light source. The remainder of the regeneration process is facilitated as the heated exhaust passes through the PM filter.

Figure 2:
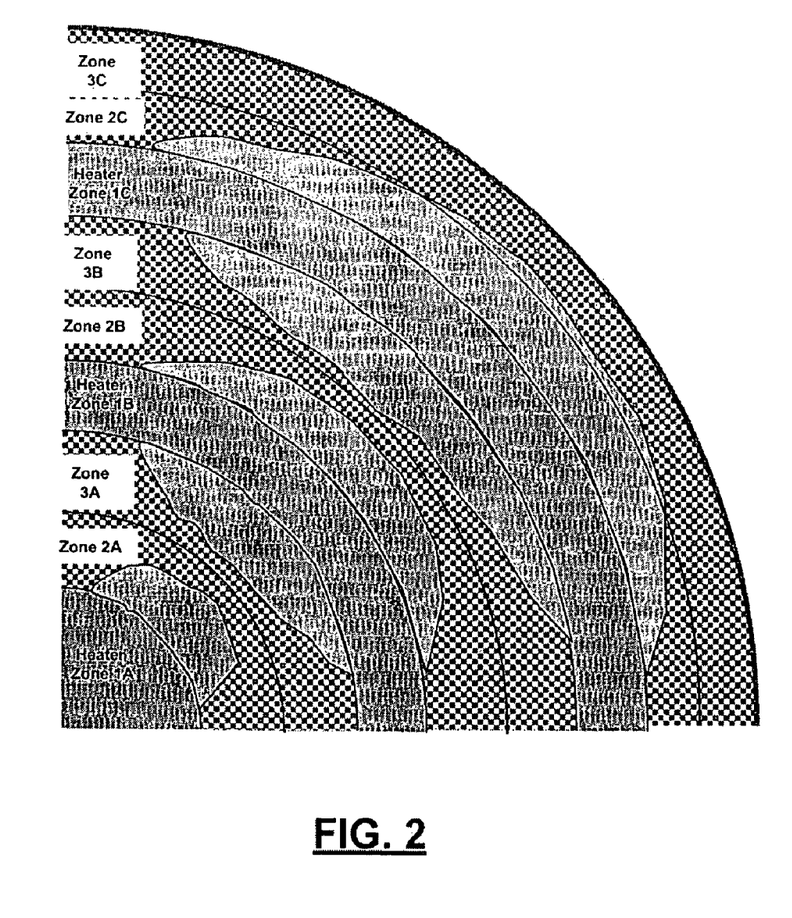
FIG. 2 illustrates exemplary zoning of the radiant zoned inlet heater of the radiant heated particulate matter (PM) filter of FIG. 1 in further detail.

Referring now to FIG. 2, an exemplary radiant zoned inlet heater 35 for the PM filter assembly 34 is shown in further detail. The heater 35 is arranged spaced from the PM filter assembly 34. The PM filter assembly 34 includes multiple spaced heater zones including zone 1 (with sub-zones 1A, 1B and 10), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 10 are activated and sub-zones 2A, 2B, 2C, 3A, 3B, and 3C act as stress mitigation zones.

The corresponding portions of the PM filter downstream from the active heater sub-zones 1A, 1B and 10 thermally expand and contract during heating and cooling. The stress mitigation sub-zones 2A and 3A, 2B and 3B, and 2C and 3C mitigate stress caused by the expansion and contraction of the heater sub-zones 1A, 1B and 10. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
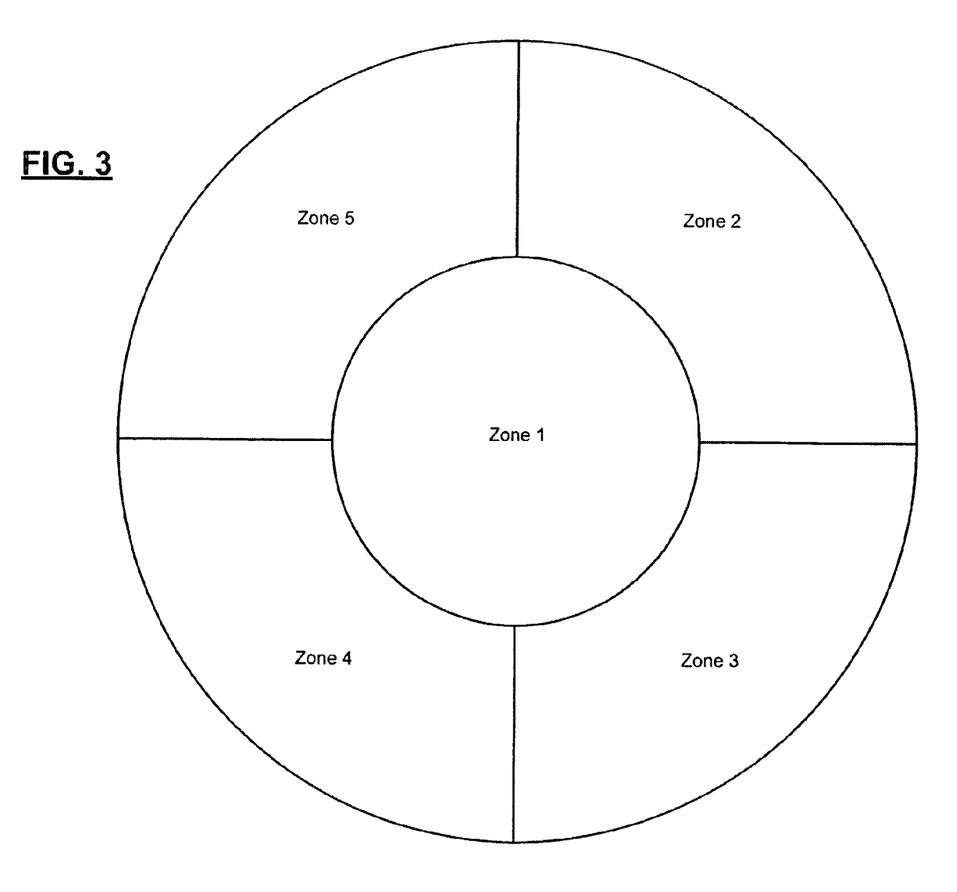
FIG. 3 illustrates exemplary zoning of the radiant zoned inlet heater of the radiant heated PM filter of FIG. 1 in further detail.

Referring now to FIG. 3, another exemplary radiant zoned inlet heater arrangement is shown. A center portion may be surrounded by an outer portion including a circumferential band of zones. In other implementations, the radiant zoned inlet heater arrangement may include multiple circumferential bands of zones.

In this example, the center portion includes zone 1. The circumferential band of zones includes zones 2, 3, 4, and 5. As with the embodiment described above, downstream portions from active zones are regenerated while downstream portions from inactive zones provide stress mitigation. As can be appreciated, one of the zones 1, 2, 3, 4, and 5 can be activated at a time. Others of the zones remain inactivated. In other implementations, multiple zones may be activated at the same time. For example, complementary zones (e.g. zones 2 and 4 or zones 3 and 5) may be activated at the same time.

Figure 4:
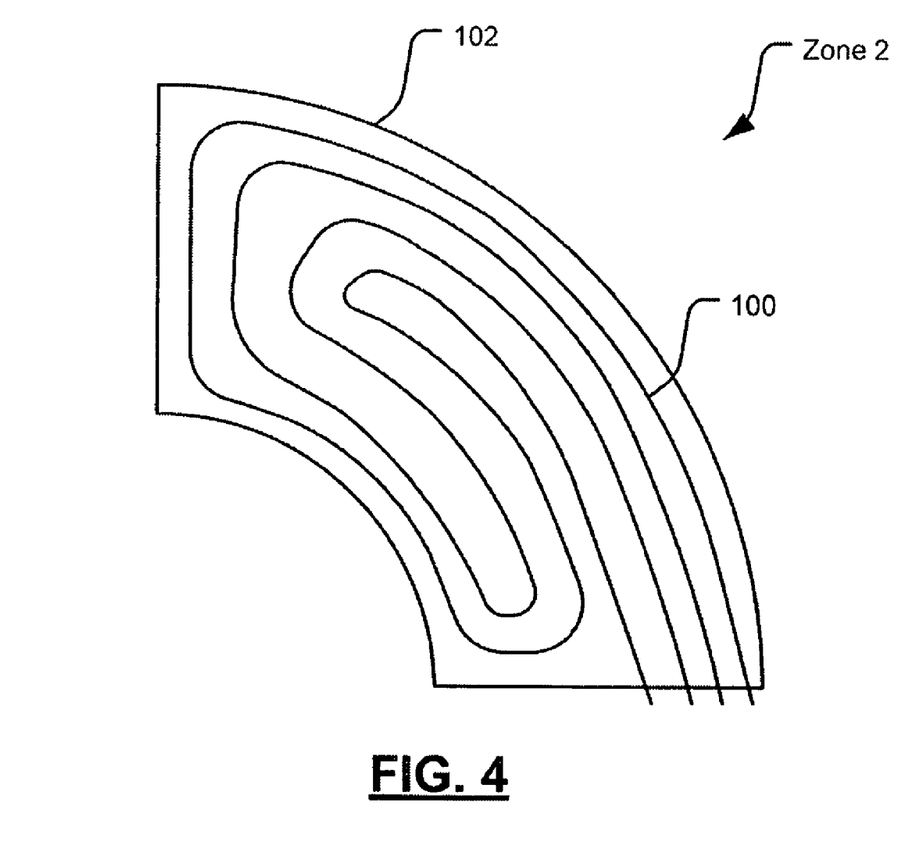
FIG. 4 illustrates an exemplary radiant heater in one of the zones of the radiant zoned inlet heater of FIG. 3.

Referring now to FIG. 4, an exemplary radiant zoned inlet heater 100 arranged adjacent to one of the zones (e.g. zone 2) from the circumferential band of zones in FIG. 3 is shown. The heater 100 may comprise, for example only, one or more resistive coils that cover the respective zone to provide sufficient radiant heat. Electrical current is input to the resistive coils to generate focused light (e.g. infrared light). When the corresponding heater 100 is activated, a reflective louver 102 is closed to prevent exhaust gas from flowing into the corresponding zone. An inner surface of the louver 102 reflects the radiant energy from the heater 100 toward the PM filter assembly 34. When an ignition temperature is reached, the louver 102 is opened, allowing the exhaust gas to flow into the corresponding zone of the PM filter.

Figure 5:
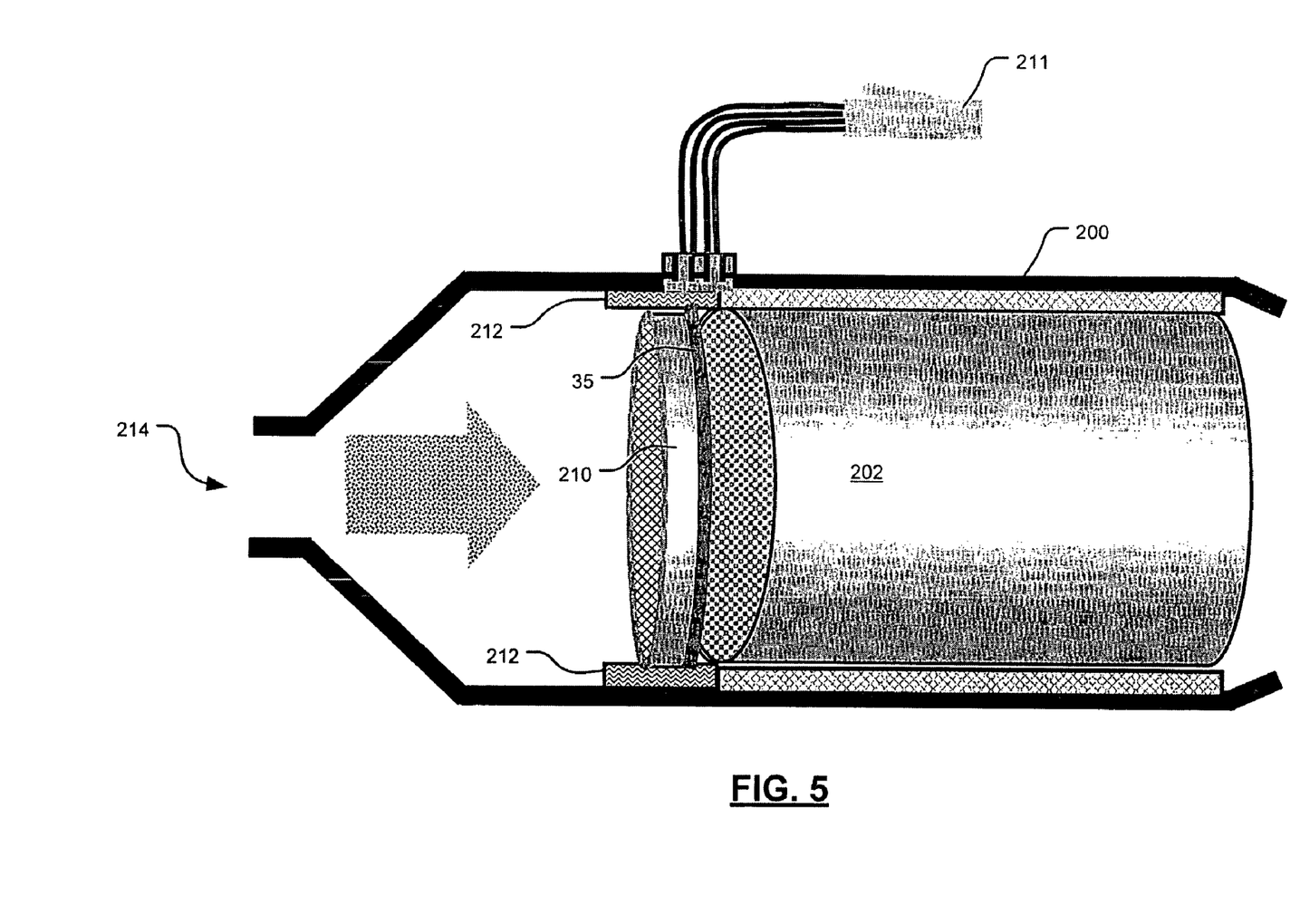
FIG. 5 illustrates the radiant heated PM filter having a radiant zoned inlet heater.

Referring now to FIG. 5, the PM filter assembly 34 is shown in further detail. The PM filter assembly 34 includes a housing 200, a filter 202, and the radiant zoned inlet heater 35. The heater 35 may be arranged between reflective louvers 210 and a substrate of the filter 202. An electrical connector 211 may provide current to the zones of the heater 35 as described above.

As can be appreciated, the heater 35 may be spaced from the filter 202 such that the heating is predominantly radiant heating. Insulation 212 may be arranged between the heater 35 and the housing 200. Exhaust gas enters the PM filter assembly 34 from an upstream inlet 214. The heater 35 may be spaced from and not in contact with the filter 202.

When one of the zones of the heater 35 is activated, a corresponding one of the reflective louvers 210 is closed. An inner (i.e. downstream) surface of the reflective louver 210 reflects the radiant heat from the heater 35 toward the filter 202. An outer (i.e. upstream) surface of the reflective louver 210 prevents exhaust gas flow in the corresponding zone of the filter 202 while a front portion of the zone is heated to an ignition temperature. When the ignition temperature is reached, the louver 210 is opened to allow exhaust flow and to facilitate filter regeneration. Each of the zones of the heater 35 is selectively and successively activated/deactivated and its corresponding louver 210 is closed/opened accordingly.

Figure 6:
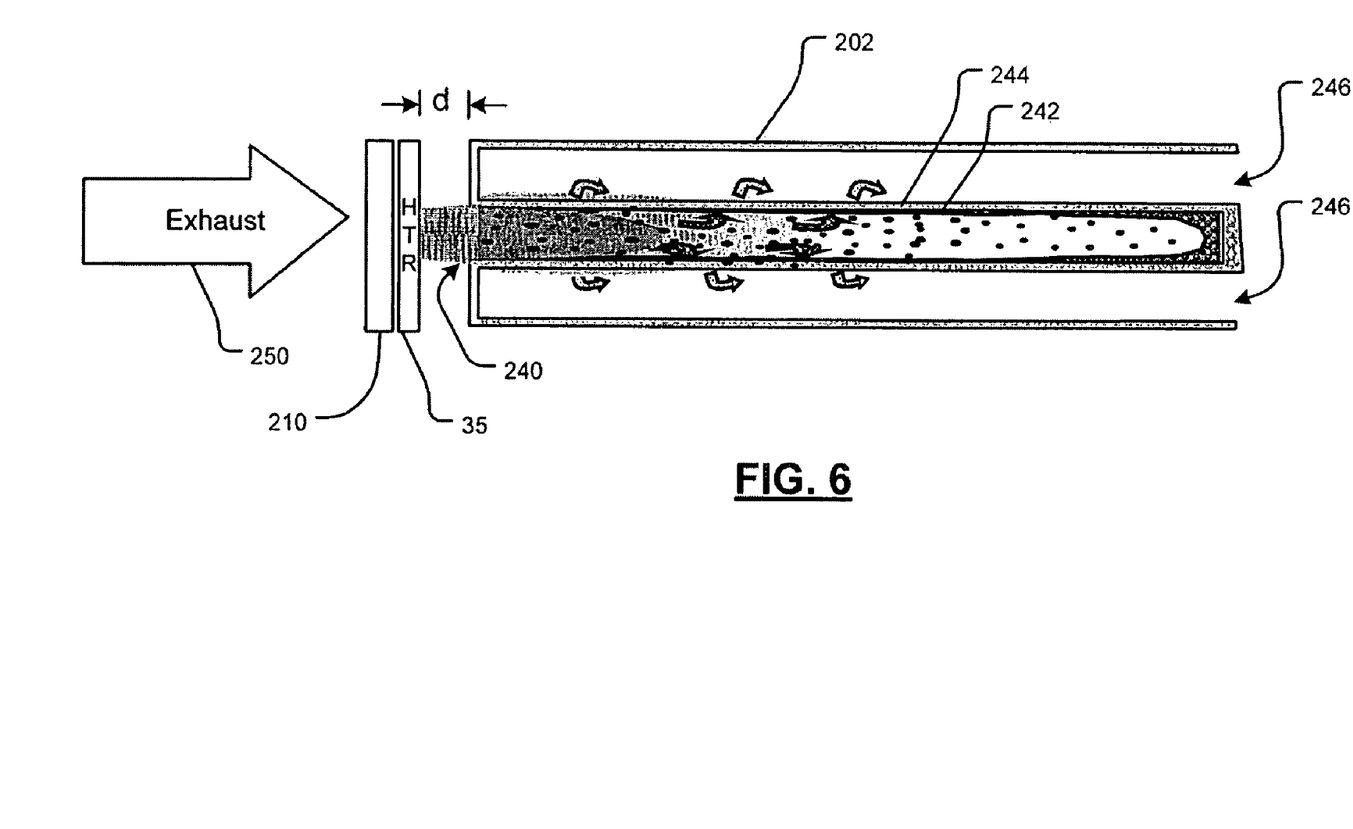
FIG. 6 illustrates heating within the radiant heated PM filter.

Referring now to FIG. 6, heating within the PM filter assembly 34 is shown in further detail. The radiant zoned inlet heater 35 generates radiant heat and the reflective louver 210 reflects the radiant heat toward the filter 202. The radiant heat travels a distance "d" and is then received by the filter 202. The distance "d" may be ½" or less. The filter 202 may have a central inlet 240, a channel 242, filter material 244 and an outlet 246 located radially outside of the inlet. The filter may be catalyzed. The radiant heat causes PM in the filter to burn, which regenerates the PM filter. The radiant heat ignites a front portion of the filter 202. When the soot in the front face portions reaches a sufficiently high temperature, the heater is turned off. The reflective louver 210 is opened to allow exhaust gas 250 to flow. Combustion of soot then cascades down a filter channel 254 without requiring power to be maintained to the heater.

Figure 7:
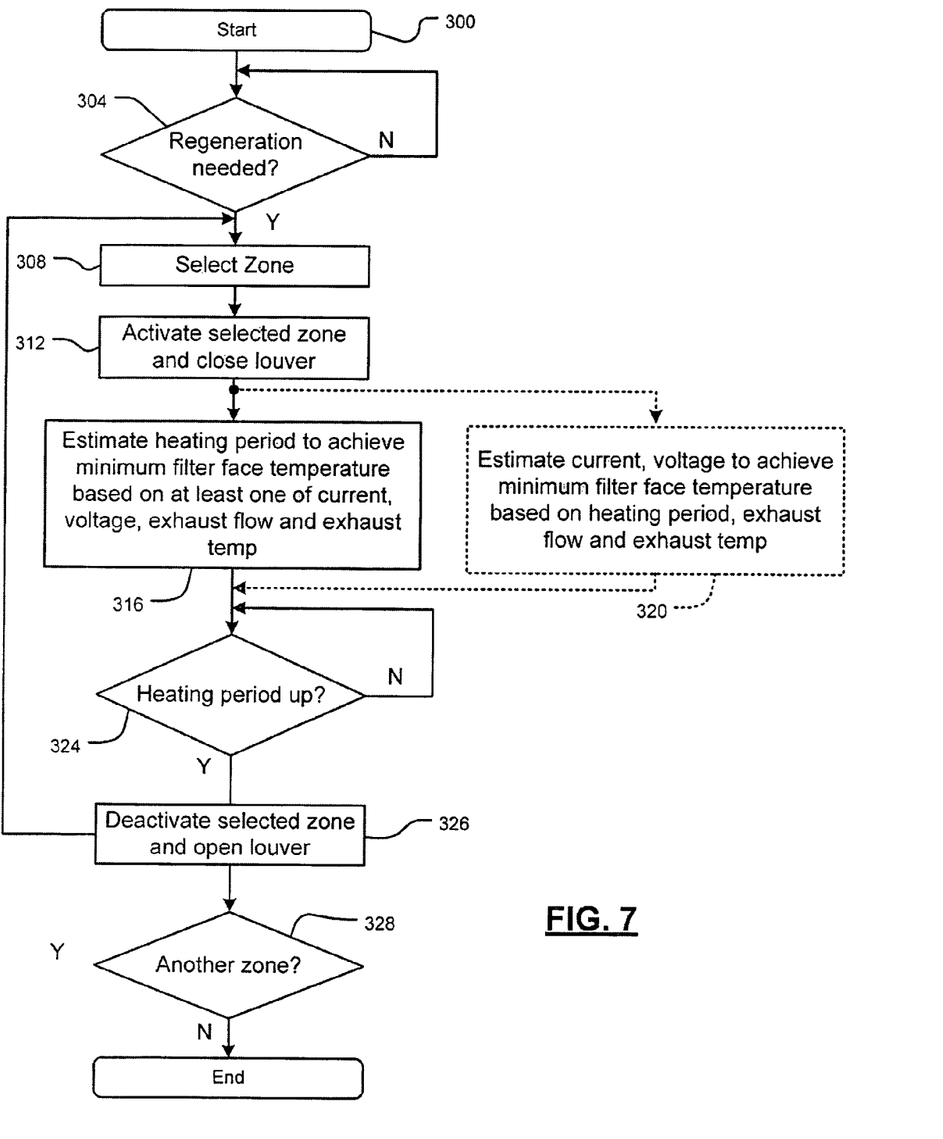
FIG. 7 is a flowchart illustrating steps performed by the control module to regenerate the PM filter.

Referring now to FIG. 7, steps for regenerating the PM filter are shown. In step 300, control begins and proceeds to step 304. If control determines that regeneration is needed in step 304, control selects one or more zones in step 308. Control activates the heater for the selected zone closes the reflective louver corresponding to the activated heater in step 312. In step 316, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsius or greater. In an alternate step 320 to step 316, control estimates current and voltage needed to achieve minimum filter face temperature based on a predetermined heating period, exhaust flow and exhaust temperature.

In step 324, control determines whether the heating period is up. If step 324 is true, control deactivates the heater zone and opens the corresponding louver in step 326. Control determines whether additional zones need to be regenerated in step 328. If step 328 is true, control returns to step 308. Otherwise control ends.

In use, the control module determines when the PM filter requires regeneration. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

Figure 8A:
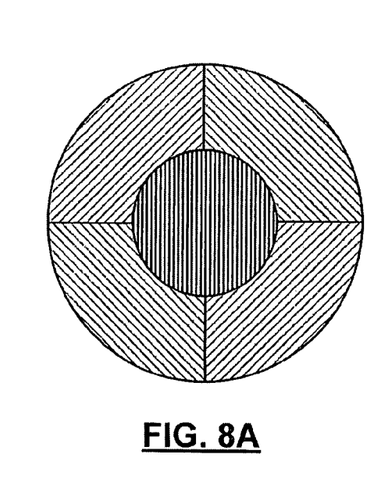
FIGS. 8A-8E illustrate a reflective louver with a selected zone of the louver closed and non-selected zones of the louver open.
Figure 8B:
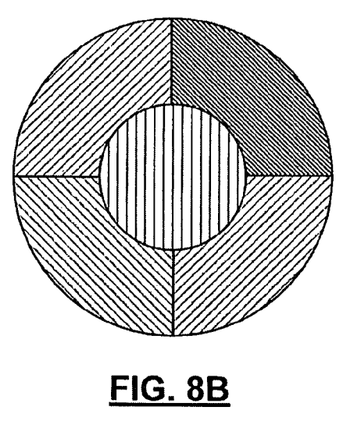
Figure 8C:
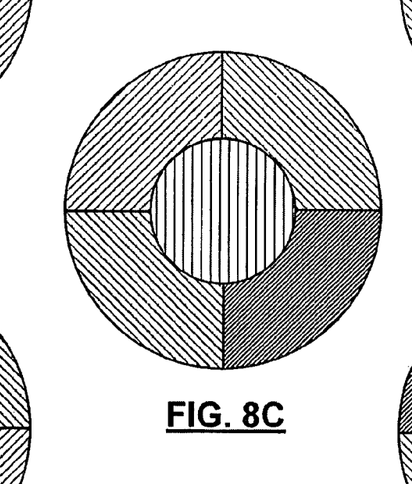
Figure 8D:
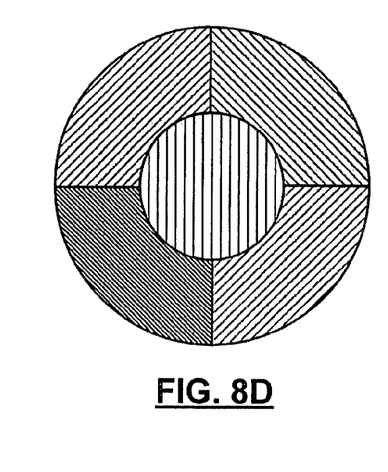
Figure 8E:
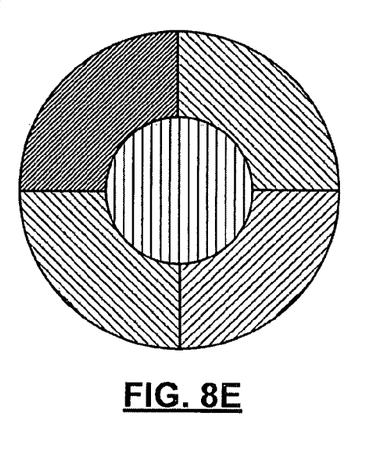

Referring now to FIGS. 8A-8E, an exemplary reflective louver is shown with a selected one of the zones closed and non-selected ones of the zones open. The selected zone that is closed corresponds to the zone of the radiant heater that is activated. Conversely, the non-selected zones correspond to the zones of the radiant heater that are deactivated. For example, as shown in FIG. 8A, zone 1 of the reflective louver is closed and the remaining zones are open. As shown in FIG. 8B, zone 2 of the reflective louver is closed and the remaining zones are open. As shown in FIG. 8C, zone 3 of the reflective louver is closed and the remaining zones are open. As shown in FIG. 8D, zone 4 of the reflective louver is closed and the remaining zones are open. As shown in FIG. 8E, zone 5 of the reflective louver is closed and the remaining zones are open.

The present disclosure may substantially reduce the fuel economy penalty, decrease tailpipe temperatures, and improve system robustness due to the smaller regeneration time.

What is claimed is:

1. A system comprising:
a particulate matter (PM) filter that comprises an upstream end for receiving exhaust gas and a downstream end;
a radiant zoned heater that comprises N zones, where N is an integer greater than one, wherein each of said N zones comprises M sub-zones, where M is an integer greater than or equal to one;
a louver that comprises N zones and M sub-zones corresponding to said N zones and M sub-zones of said radiant zoned heater, wherein said radiant zoned heater is located between said louver and said PM filter; and
a control module that selectively activates at least a selected one of said N zones to initiate regeneration in downstream portions of said PM filter from said one of said N zones and deactivates non-selected ones of said N zones,
wherein selectively activating said selected one of said N zones closes a corresponding one of said N zones of said louver to i) restrict exhaust gas flow through said corresponding one of said N zones and ii) arrange a reflective surface of said corresponding one of said N zones to reflect radiant light from said radiant zoned heater toward said upstream end of said PM filter.

2. The system of claim 1 wherein said control module allows exhaust gas to flow in said portion of said PM filter when said selected one of said N zones is deactivated.

3. The system of claim 1 wherein said non-selected ones of said N zones provide stress mitigation zones.

4. The system of claim 1 wherein said N zones are located in a center portion and a first circumferential portion radially outside of said center portion.

5. The system of claim 4 wherein said center portion comprises a first zone and said first circumferential portion comprises, a second zone, a third zone, a fourth zone, and a fifth zone.

6. The system of claim 1 wherein said control module estimates a heating period based on at least two of power supplied to said radiant zoned heater, exhaust flow, and exhaust temperature.

7. The system of claim 1 wherein said control module estimates a heating period to heat a face portion of said PM filter a temperature greater than or equal to a predetermined temperature and shuts down said radiant zoned heater after said heating period.

8. The system of claim 7 wherein said predetermined temperature is 700 degrees Celsius.

9. A method comprising:
providing a particulate matter (PM) filter comprises an upstream end for receiving exhaust gas and a downstream end;
arranging a radiant zoned heater that comprises N zones, where N is an integer greater than one, wherein each of said N zones comprises M sub-zones, and where M is an integer greater than or equal to one;
arranging a louver that comprises N zones and M sub-zones corresponding to said N zones and M sub-zones of said radiant zoned heater, wherein said radiant zoned heater is located between said louver and said PM filter;
selectively activating at least a selected one of said N zones to initiate regeneration in downstream portions of said PM filter from said one of said N zones;
closing a corresponding one of said N zones of said louver to i) restrict exhaust gas flow through said corresponding one of said N zones and ii) arrange a reflective surface of said corresponding one of said N zones to reflect radiant light from said radiant zoned heater toward said upstream end of said PM filter; and
deactivating non-selected ones of said N zones.

10. The method of claim 9 further comprising allowing exhaust gas to flow in said portion of said PM filter when said selected one of said N zones is deactivated.

11. The method of claim 9 wherein said non-selected ones of said N zones provide stress mitigation zones.

12. The method of claim 9 wherein said N zones are located in a center portion and a first circumferential portion radially outside of said center portion.

13. The method of claim 12 wherein said center portion comprises a first zone and said first circumferential portion comprises said first zone, a second zone, a third zone, a fourth zone, and a fifth zone.

14. The method of claim 9 further comprising estimating a heating period based on at least two of power supplied to said radiant zoned heater, exhaust flow and exhaust temperature.

15. The method of claim 9 further comprising estimating a heating period to heat a face portion of said PM filter a temperature greater than or equal to a predetermined temperature and shutting down said radiant zoned heater after said heating period.

16. The method of claim 15 wherein said predetermined temperature is 700 degrees Celsius.

* * * * *